United States Patent [19]

Garcera et al.

[11] Patent Number: 4,640,774
[45] Date of Patent: Feb. 3, 1987

[54] ASSEMBLY OF MOUNTED TUBULAR FILTER MEMBERS INSIDE AN ENVELOPE

[75] Inventors: Daniel Garcera, Tarbes; Jacques Gillot, Odos, both of France

[73] Assignee: Ceraver, S.A., Paris, France

[21] Appl. No.: 748,581

[22] Filed: Jun. 19, 1985

[30] Foreign Application Priority Data

Jun. 20, 1984 [FR] France ............................ 84 09687

[51] Int. Cl.$^4$ ............................................ B01D 13/00
[52] U.S. Cl. ............................ 210/323.2; 210/321.1;
210/450; 55/502; 55/507
[58] Field of Search ................ 210/323.2, 450, 433.2,
210/455, 321.1, 321.2, 321.3, 321.4, 232;
55/158, 502, 507, 509

[56] References Cited

U.S. PATENT DOCUMENTS

| | | | |
|---|---|---|---|
| 3,237,775 | 3/1966 | Porter et al. | 210/323.2 |
| 3,471,178 | 10/1969 | Roe | 264/130 |
| 3,834,545 | 9/1974 | Del Pico et al. | 210/321.1 |
| 4,021,350 | 5/1977 | Koslowski | 210/232 |
| 4,587,016 | 5/1986 | Sumiyoshi | 210/323.2 |

FOREIGN PATENT DOCUMENTS

| | | | |
|---|---|---|---|
| 0154295 | 9/1985 | European Pat. Off. | 210/321.1 |
| 7804142 | 10/1979 | Netherlands | 210/321.1 |

Primary Examiner—Ernest G. Therkorn
Assistant Examiner—Linda S. Evans
Attorney, Agent, or Firm—Kenyon & Kenyon

[57] ABSTRACT

An assembly of a tubular filter member (2) inside an envelope (5) surrounding the member includes a gasket (9) of elastomer or polymer material disposed at at least one of the ends of the filter member and of the envelope in between the outside surface of the filter member and the inside surface of the envelope.

The outside surface of the filter member is provided over at least a portion of its surface area facing the gasket with roughnesses (11) or projections or hollows of sufficient size and number to prevent the filter element from sliding longitudinally relative to the gasket.

Such an assembly is applicable to microfiltration, ultra-filtration and reverse osmosis.

10 Claims, 10 Drawing Figures

ASSEMBLY OF MOUNTED TUBULAR FILTER MEMBERS INSIDE AN ENVELOPE

The present invention relates to an assembly of at least one tubular filter or separator member inside an envelope surrounding said member, the assembly including a gasket of elastomer or polymer material disposed at at least one of the ends of the filter member and of the envelope in between the outside surface of the filter member and the inside surface of the envelope. The invention is particularly, but not exclusively, applicable to membrane separator devices or to filter devices comprising bundles of porous tubes, for use in filtration, ultrafiltration, or reverse osmosis, as described in French patent application No. 84 03368 filed Mar. 5, 1984. Such separator devices are constituted by a macroporous block made of sintered metal, glass, or ceramic, or else of carbon, and the block is pierced by parallel longitudinal channels.

A plurality of membrane separator members of this type are mounted in an envelope by means of gaskets made of plastic or elastic material and having several functions, including:

separating a cavity containing a liquid to be filtered from a cavity containing filtrate;

holding the filter members in place in the presence of a large pressure difference (which may be several tens of bars) between said cavities; and withstanding differences in thermal expansion between the envelope (made of metal or of a glass fiber reinforced plastic) and the filter member, which is generally made of ceramic material, said differences due to thermal expansion being capable of reaching 0.5 mm or even 1 mm.

The outside surface of a tubular filter member is generally smooth, either by virtue of being covered with an enamel or a resin to prevent communication between the cavities containing the liquid to be filtered and the filtrate via large pores in the membrane support, or else because the member is made by an extrusion process. The resistance of the filter member to sliding relative to the gasket is relatively low, particularly when the filter member is in the presence of liquids which act as lubricants to said sliding, e.g. viscous liquids or a solution of caustic soda as is often used for cleaning the surface of a separator membrane after filtering greasy products, with the caustic soda reacting with the grease to produce soap.

Up to now, such sliding has been prevented either:

by highly compressing the gasket, with the attendant risk of tearing it; or by gluing the gasket to the filter member, in which case it is difficult to find glues which withstand the shear stresses involved, which withstand chemical attack from fluids being filtered or from cleaning fluids, which withstand the high temperatures often used during filtering, and which have good in-service ageing characteristics; or else by means of mechanical stops, which are expensive and which must often be complicated in shape, thereby giving rise to cavities or slots which are difficult to clean and likely to shelter proliferating microorganisms.

The aim of the present invention is to remedy these difficulties and provide an assembly of a tubular filter member, by means of a gasket, in an envelope surrounding said member in such a manner as to withstand not only sliding but also chemical attack and high temperatures, while nevertheless being of simple structure and being cheap to manufacture.

The assembly according to the invention comprises at least one tubular filter member inside an envelope surrounding said member and a gasket of elastomer or polymer material disposed at at least one of the ends of the filter member and the envelope between the outside surface of the filter member and the inside surface of the envelope, the outside surface of the filter member being provided, at least over that portion of its length which faces the gasket, with roughnesses, projections, or hollows of suitable size and in sufficient number to prevent the filter member from sliding relative to the gasket.

The invention preferably includes one or other of the following variant embodiments:

the end of the filter member is covered with enamel or glass, and the roughnesses are constituted by large grains of enamel or glass;

the roughnesses are constituted by large grains dispersed in an organic adhesive which is deposited on the end of the filter member;

the end of the filter member is coated with synthetic resin, and the roughnesses are formed by large grains encrusted onto the synthetic resin;

the roughnesses are constituted by large grains projected or deposited in an at least partially melted state, and then brazed around the filter member;

the roughnesses are formed by abrading the end of the filter member;

the projections are constituted by local or circumferential excess thicknesses made up from one or more tapes of material wound around the end of the filter member; or the hollows are circumferential and result from local deformation of the end of the filter member while being shaped prior to sintering or baking, or from machining the end of a filter member which has already been sintered or baked.

The rough surface or the surface provided with projections or hollows may cover the entire contact area between the filter member and the gasket. In this case resistance to sliding is very high. However, there are risks of leaks unless the gasket conforms itself very closely to the more or less irregular variations on the outside surface of the filter member.

Alternatively the rough portion of the filter member surface may constitute only a part of the contact area between the filter member and the gasket, and in particular, may lie between two portions of non-modified surface which therefore remain relatively smooth. This arrangement provides improved sealing, but less resistance to sliding than the first arrangement.

BRIEF DESCRIPTION OF THE DRAWINGS

Embodiments of the invention are described by way of example with reference to the accompanying drawings, in which.

DESCRIPTION OF THE PREFERRED EMBODIMENTS

Example 1

Figure 1:
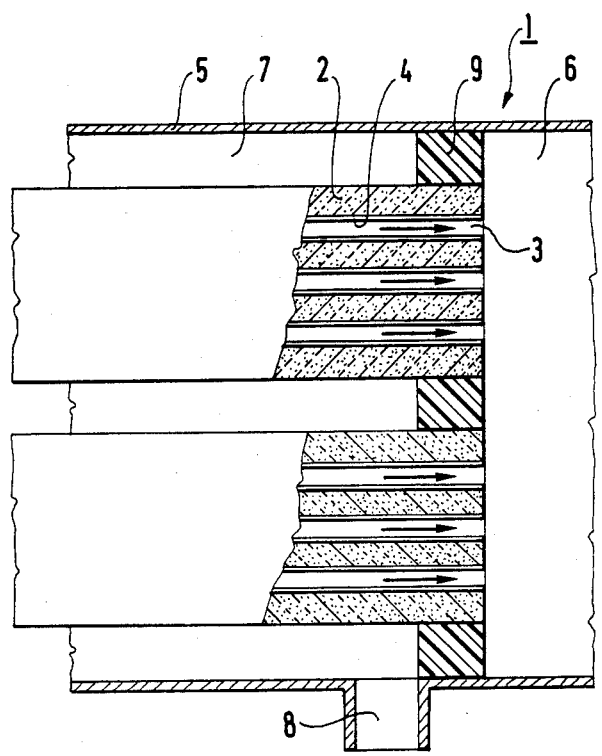
FIG. 1 is a section through an end portion of a macroporous filter member having longitudinal channels and to which the invention is applicable.

Use is made of a macroporous block with longitudinal channels provided with filter membranes to form a tangential filter member, one end of which is shown in FIG. 1. This filter member 1 comprises a block 2 having an outside surface, and channels 3 passing through the block and conveying the fluid to be filtered. The channels 3 are provided with filter membranes 4 having an average pore size which is considerably smaller than the average pore size of the block. The block is surrounded by a metal envelope 5 which defines a chamber 7 surrounding the macroporous block for receiving the filtrate and a chamber 6 beyond the righthand end (as shown in the figures) of the block for receiving excess fluid to be filtered. A tube 8 serves to evacuate the filtrate. The chambers 6 and 7 are isolated from each other by a gasket 9 of elastomer material.

The end of the filter member is sealed over a length of 30 mm by an enamel whose composition by weight is as follows:

$SiO_2$: 72%
$Al_2O_3$: 14%
MgO: 4%
CuO: 4.5%
$K_2O$: 3%
$Na_2O$: 2.5%

The enamel is crushed to obtain a powder having an average particle diameter of about 1 micron. A slip is then prepared having the following composition by weight.

Enamel powder: 54.5%
Water: 43.7%
Polyvinyl alcohol (Rhodoviol 4/125 from Rhône-Poulenc): 0.3%
Darvan C wetting agent (from Polyplastic): 1.5%

A very highly deflocculated slip is thus obtained. The slip is poured into an ultrasonically stirred vessel. Each end of the block is dipped into the liquid to a depth of 25 mm, and is kept there for a period of 30 min with ultrasonic stirring. At the end of this period, the slip has penetrated into the pores at the end of the block and up to 30 mm from the end (25 mm directly immersed in the slip, plus 5 mm by capillarity). The block is then removed from the bath of slip, and the absorbed slip is dried.

Then a slip is prepared having the following composition by weight:

Enamel powder: 45%
Alumina grains having an average size of 180 microns: 25%
Polyvinyl alcohol (Rhodoviol 4/125): 0.5%
Darvan C wetting agent: 1.5%
Water: 28%

Figure 3:
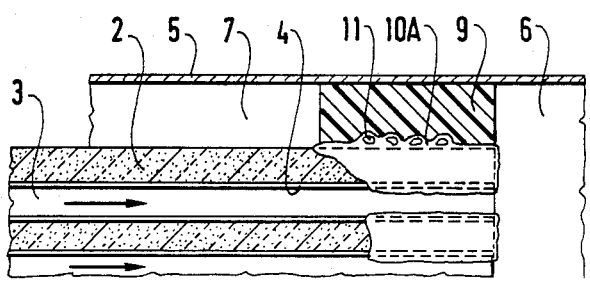
FIG. 3 is a view similar to FIG. 2 showing the end of a filter member which is covered with a sealing enamel and then by a second enamel in which large grains of ceramic material have been incorporated.

This slip is very viscous. It is brushed around the end of the macroporous filter member over a width of 8 mm in a strip 10A (see FIG. 3) and leaving an uncovered margin having a width of 9 mm between the strip and the end of the filter member. The grains of alumina 11 in said second slip are too big to penetrate into the pores of the filter member.

The two deposits are simultaneously baked under an oxidizing atmosphere at 1300° C. in order to melt the enamel. This operation is performed at both ends of the member.

The result is a filter member having ends which are sealed over a length of 30 mm and which bear a rough strip of width 9 mm in the middle of the sealed zone.

Figure 10:
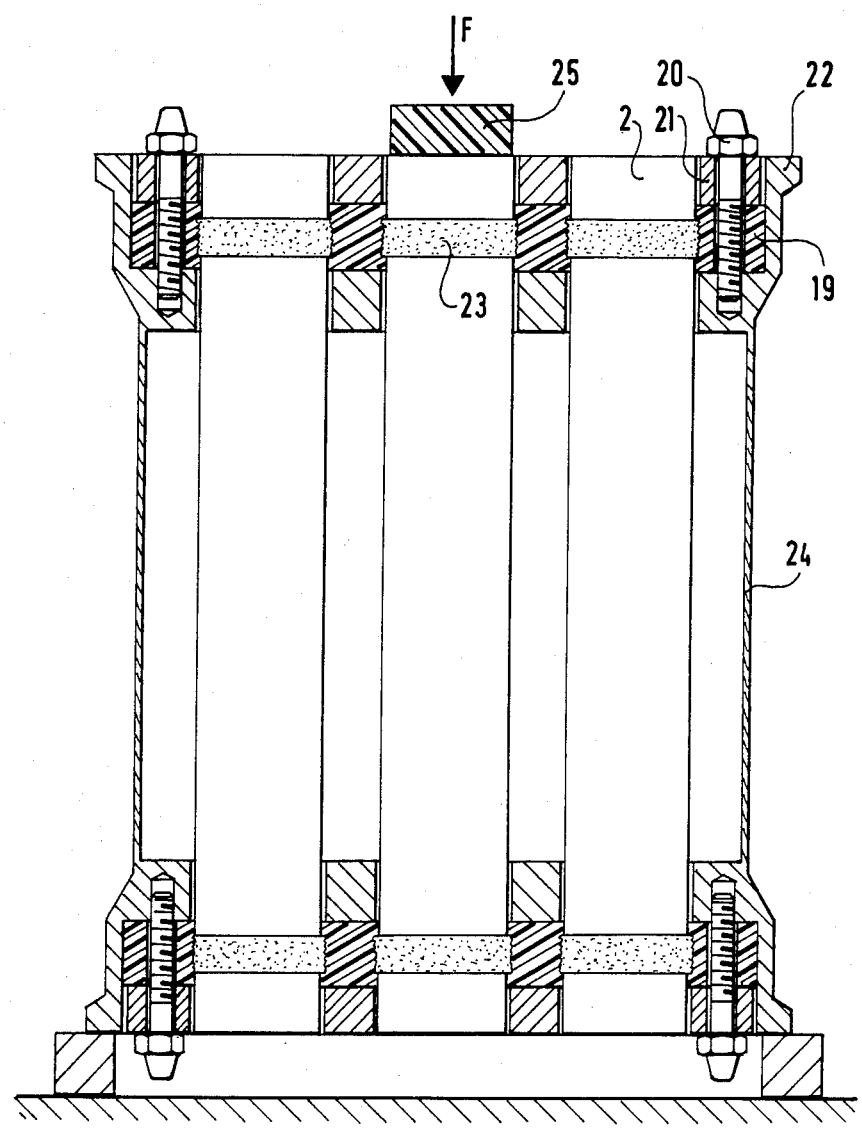
FIG. 10 is a section through a filter member showing the sealing gaskets at both ends and bolts for clamping said gaskets between steel plates.

Seven filter members of this type are then mounted in a steel envelope 24 by means of a compressed silicone rubber gasket 19 having a Shore hardness of 50, as shown in FIG. 10 in which only the exteriors of the filter members are shown, for reasons of clarity. The gasket 19 is compressed by means of bolts 20 which clamp it between two steel plates 21 and 22 extending in planes perpendicular to the axes of the filter members. The filter members have rough zones 23 where they engage the gasket. A vacuum is set up in the outer envelope 24, which is then filled with a 5% by weight solution of caustic soda and left to soak for four hours in order to be sure that the soda has penetrated wherever it can.

With the metal plates 21 and 22 fixed in position, a force F is applied axially to one of the filter members by means of a block 25, and said force is increased until the filter member slides relative to the gasket. The force required to obtain sliding is:

300 Newtons in the absence of a rough zone or
1700 Newtons in the presence of a rough zone obtained in the manner indicated above.

Example 2

Figure 2:
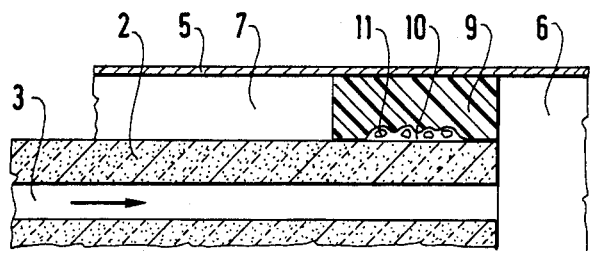
FIG. 2 is a section through a portion of the end shown in FIG. 1 drawn to a larger scale to show details of the contact area between the sealing gasket and the filter member; in this case the end of the filter member is not impregnated with sealing enamel, and the large grains of ceramic material are disposed in enamel which is deposited around the end of the member.

The filter member shown in FIG. 2 is a tube having an inside diameter of 7 mm and an outside diameter of 10 mm. The average pore diameter is 15 microns and the tube is extruded of pure alumina. There is no coating of smaller pore size on its inside surface, and it is therefore unnecessary to seal its ends.

The outside surface of the tube around its ends is covered over a zone extending for 30 mm from its ends with the second slip used in Example 1, and the tube is baked in order to melt the enamel. In this manner, a rough strip 10 having upstanding particles 11 extending over a width of 30 mm is obtained at each end of the tube.

Seven such tubes are assembled in a metal envelope by means of a compressed elastic gasket applied over a 30 mm region from each end of the tubes and thus exactly coinciding with the rough surface.

The same test is performed as in Example 1, and the maximum resistance to sliding is as follows:
 150 Newtons in the absence of a rough surface and
 700 Newtons with a rough surface (beyond which force the gasket tears).

Example 3

Proceed as for Example 1, but replace the enamel in the layer 10A with epoxy resin sold under the trademark "Araldite", which resin serves both to impregnate the end of the filter member 2 (see FIG. 3) and to glue the alumina grains 11 to its outside surface.

The limit values for withstanding sliding are:
 300 Newtons in the absence of a rough surface and
 1500 Newtons with a rough surface.

Example 4

Figure 5:
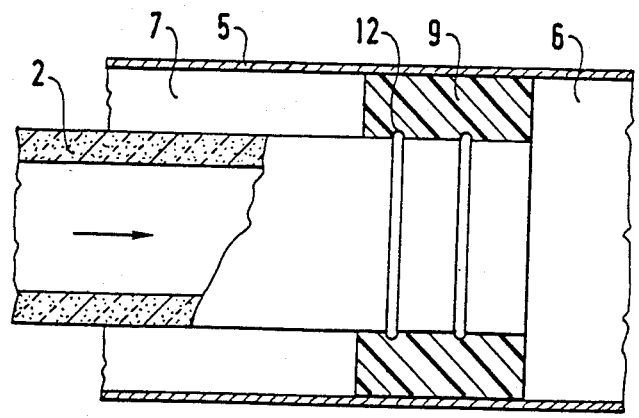
FIG. 5 is a view in partial section of one end of a filter member received inside a metal envelope, showing localized regions of increased thickness in the form of circular ribs on the outside surface of the filter member, said regions being made from tapes of ceramic or synthetic resin material wound around the end of the filter member.

A pasty ceramic composition is deposited on the filter elements used in Example 2. The composition, by weight, of the ceramic paste is as follows:
 35%: Alumina having an average grain size of 0.5 microns
 40%: Alumina having an average grain size of 10 microns
 1%: Methylhydroxypropylcellulose
 0.5%: Darvan C wetting agent
 23.5%: Water The circles of pasty ceramic are applied around each end of the filter member. After sintering, these form two circular ribs 12 (FIG. 5). These ribs are 4 mm wide and 0.8 mm thick and are situated at 10 mm and 18 mm from the end of the filter member. The limit values for resistance to sliding are as follows:
 150 Newtons without any ribs and
 600 Newtons with ribs.

Example 5

Proceed as for Example 4, except that the ribs of ceramic material are replaced by ribs having the following composition by weight:
 Epoxy resin: 20%
 Alumina fill (average size=100 microns): 80%

The following limit values for resistance to sliding are obtained:
 150 Newtons without a rib and
 600 Newtons with ribs.

Example 6

The same filter member is used as for Example 2. While the tube constituting said member is being fabricated, just after extrusion, and while it is still in the form of a plastic paste, it is deformed so as to create a circumferential groove of width 8 mm and depth 0.5 mm around each end thereof at a distance of 15 mm from said ends.

It is used in conjunction with a glued silicone rubber. In order to improve adhesion between the various materials, the active portions of the filter member and of the envelope are previously treated by means of a priming coat such as the product 1200 sold by the Dow Corning company, and then the gasket is molded in situ.

The limiting forces for withstanding sliding are as follows:
 150 Newtons without a groove and
 400 Newtons with a groove.

Example 7

Use the macroporous block of Example 1, the block having longitudinal channels therethrough, and impregnate the ends thereof with enamel over a length of 30 mm.

Figure 8:
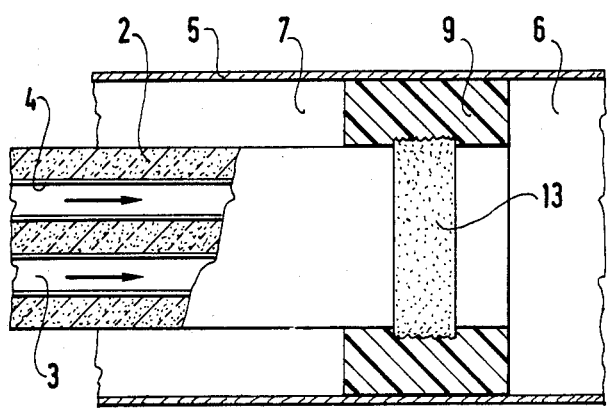
FIG. 8 is a view similar to FIG. 5 in which only a portion of the outside surface of the filter member in contact with the gasket is provided with roughnesses.

Form a rough zone in the outside enamelled surface 13 (FIG. 8) by sanding over a width of 12 mm in the middle of the enamelled zone (using a mask to avoid sanding the portions of the enamelled zone which are to remain smooth).

The limit values for resistance to sliding are
 300 Newtons without a rough zone and
 500 Newtons with a rough zone.

Example 8

Proceed as in Example 4, but make the ribs as follows: form three ribs of width 3 mm and thickness 0.5 mm using Schoop's metal spraying process (spraying particles that have been melted in a flame) using alumina particles and using masks to limit the spraying to the zones where the ribs are to be formed.

The limit forces for the beginning of sliding are as follows:
 150 Newtons without any ribs;
 650 Newtons with ribs.

Example 9

Figure 9:
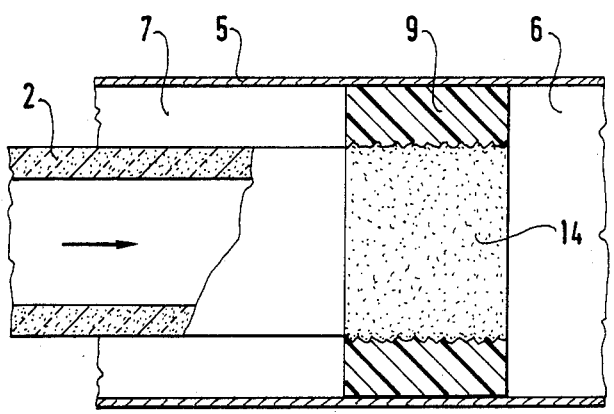
FIG. 9 is a view similar to FIG. 5 in which the entire outside surface of the filter member in contact with the gasket is provided with roughnesses.

The filter member is a tube of stainless steel 2 (FIG. 9) having an inside diameter of 15 mm and an outside diameter of 30 mm. The tube is obtained by sintering stainless steel powder having an average particle diameter of 30 microns. Its outside surface 14 is covered over a length of 30 mm from each end with a mixture constituted by 4 parts by weight of copper-silver brazing composition and one part by weight small stainless steel balls having an average diameter of 100 mirons, the balls being covered with an organic glue.

The filter member is heat treated at 700° C. during which treatment the brazing compound melts. The small balls are bound to the filter member by the brazing compound and constitute a rough layer on the outside surface of the filter member, and any excess brazing compound is absorbed by capillarity into the pores of the filter member.

The resistance to sliding tests gives the following results:
 250 Newtons without a rough zone;
 1200 Newtons with rough zones.

Figure 4:
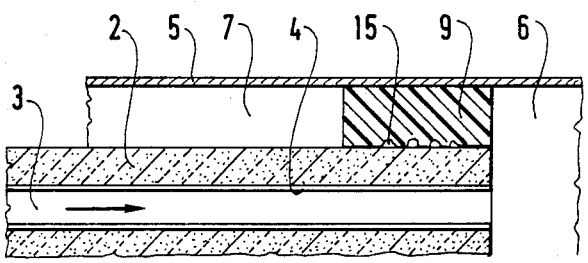
FIG. 4 is a view similar to FIGS. 2 and 3 showing large grains of ceramic bound to the filter member by sintering.

In the filter member shown in FIG. 4, the large ceramic grains 15 are deposited on the outside surface of the filter member by means of an organic glue. Sintering is then performed, during which the organic glue is burned and the ceramic grains are bound to the outside surface of the member.

Figure 6:
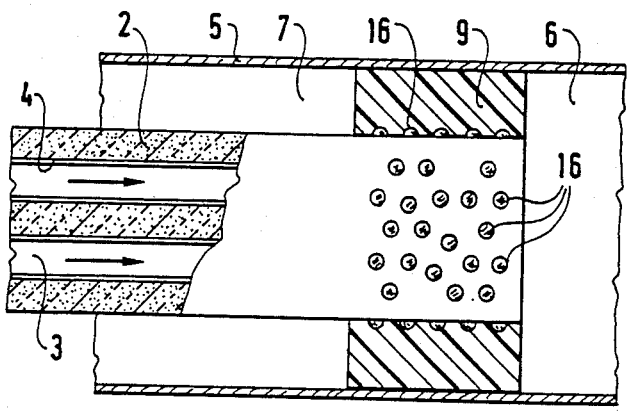
FIG. 6 is a view similar to FIG. 5 in which the localized regions of greater thickness are in the form of spots constituted by depositing grains of material on the surface of the filter member by projecting the grain material while in the melted state or while partially melted.

In the filter member shown in FIG. 6, projections 16, e.g. of ceramic material, are disposed on the zone of the outside surface at the end of the member where it faces the gasket 9. They are obtained as follows: after or before the member is sintered, a tape of ceramic paste is deposited on the end of the member and then baked in order to sinter said tape and to sinter it to the surface of the member. It is also possible to use grains of ceramic material which are bound to one another and to the surface of the filter member by an enamel, or by a polymerizable resin which may optionally be filled with grains of inorganic material. Finally, these projections may be provided by locally deforming the material from which the filter member is made while said material is being shaped.

Figure 7:
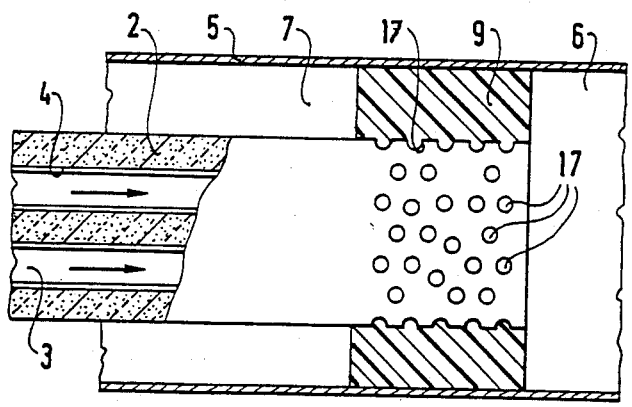
FIG. 7 is a view similar to FIG. 5 having hollows formed in the outside surface of the filter member.

FIG. 7 shows depressions 17 formed in the outside surface at the end of the filter member. These depressions are obtained either by locally deforming the filter member material while said material is being shaped, or else by machining the filter member after it has been shaped.

The assembly in accordance with the invention serves firstly, as has been shown by the tests described in the examples, to very considerably increase resistance to sliding between a filter member and a gasket holding said member. The filter member does not move while the compressed gasket is clamped. In operation, gaskets clamped against smooth surfaces do not hold filter members adequately in the long run, and the filter members shift longitudinally under the effect of pressure differences, pressure rises and falls, occasional hammering or shock waves, and also differential thermal expansions. The danger of longitudinal shifting relative to the gasket in operation is increased for glued gaskets.

The present invention thus makes it possible to dispense with using mechanical stops in order to prevent such shifting, and in particular to dispense with the expensive machining of the plates used to compress the gasket.

The invention also makes it possible to use gaskets made from a more flexible material, since the gasket no longer needs to be clamped so tightly around the filter member. Such gaskets of increased flexibility are better at withstanding the deformation due to differential thermal expansion between the envelope, which is generally made of metal, and the filter members, which are generally made of ceramic.

We claim:

1. An assembly of at least one elongated tubular filter member having an outside surface, two ends, and at least one channel extending from end to end therethrough; an elongated envelope surrounding said member, the envelope having an inside surface spaced from the outside surface of the filter member; and a gasket of elastomeric or polymeric material disposed at at least one of the ends of the filter member between the outside surface of the tubular filter member and the inside surface of the envelope, the gasket contacting the filter member and the envelope over a portion of their respective lengths, wherein the improvement comprises:

the outside surface of the filter member is provided, over at least a part of that portion of its length which contacts the gasket, with roughnesses, projections, or hollows of suitable size and in sufficient number to prevent the filter from sliding relative to the gasket due to differential thermal expansion of the filter member and the envelope.

2. An assembly according to claim 1 wherein the one end of the filter member is covered with enamel or glass, and wherein the roughnesses are constituted by large grains in the enamel or glass.

3. An assembly according to claim 1 wherein an organic adhesive is deposited on the one end of the filter member, and the roughnesses are constituted by large grains dispersed in the deposited adhesive.

4. An assembly according to claim 1 wherein the one end of the filter member is covered with synthetic resin, and the roughnesses are constituted by large grains encrusted in the synthetic resin.

5. An assembly according to claim 1 wherein the roughnesses are formed by large grains projected onto the one end of the filter member in an at least partially molten state.

6. An assembly according to claim 1 wherein the roughnesses are formed by large grains deposited around the one end of the filter member and then brazed.

7. An assembly according to claim 1 wherein the one end of the filter member is abraded to form said roughnesses.

8. An assembly according to claim 1 wherein the projections are constituted by spaced apart local excess thicknesses of the tubular filter member.

9. An assembly according to claim 1 wherein the projections are constituted by spaced apart circumferential excess thicknesses, and these thicknesses are constituted by tapes of material wound around the one end of the filter member.

10. An assembly according to claim 1 wherein the hollows comprise spaced apart local indentations around the one end of the filter member.

* * * * *